US009814073B2

(12) United States Patent
Barbieri et al.

(10) Patent No.: US 9,814,073 B2
(45) Date of Patent: Nov. 7, 2017

(54) PRACH-BASED PROXIMITY DETECTION

(71) Applicant: QUALCOMM Incorporated, San Diego, CA (US)

(72) Inventors: Alan Barbieri, San Diego, CA (US); Hao Xu, San Diego, CA (US); Vikas Jain, San Diego, CA (US); Durga Prasad Malladi, San Diego, CA (US); Awaiz Ahmad Khan, San Diego, CA (US); Samatha Kotla, San Diego, CA (US); Balwinderpal Sachdev, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 14/165,351

(22) Filed: Jan. 27, 2014

(65) Prior Publication Data

US 2014/0211677 A1 Jul. 31, 2014

Related U.S. Application Data

(60) Provisional application No. 61/758,644, filed on Jan. 30, 2013.

(51) Int. Cl.
*H04W 74/08* (2009.01)
*H04W 52/28* (2009.01)
(Continued)

(52) U.S. Cl.
CPC ........... *H04W 74/0833* (2013.01); *G01S 5/00* (2013.01); *H04L 1/00* (2013.01); *H04W 52/0229* (2013.01);
(Continued)

(58) Field of Classification Search
None
See application file for complete search history.

(56) References Cited

U.S. PATENT DOCUMENTS 6,590,533 B2 * 7/2003 Sollenberger ............. G01S 5/02 342/387
7,706,824 B2 4/2010 Schulist et al.
(Continued)

FOREIGN PATENT DOCUMENTS

| | | | |
|---|---|---|---|
| CN | 102440019 | A | 5/2012 |
| EP | 2536221 | A1 | 12/2012 |
| WO | WO-2011127647 | A1 | 10/2011 |

OTHER PUBLICATIONS

Ericsson: "LTE energy saving solution proposal following discussions at RA 3#65 bis," 3GPP Draft; R3-093103, 3rd Generation Partnership Project (3GPP), Mobile competence Centre; 650, Route Des Lucioles; F-06921 Sophia-Antipolis Cedex; France, No. Jeju; Nov. 9, 2009, Nov. 9, 2009 (Nov. 9, 2009), XP050392563, 2 pages, [retrieved on Nov. 19, 2009] the whole document.
(Continued)

*Primary Examiner* — Hassan Kizou
*Assistant Examiner* — Ashil Farahmand
(74) *Attorney, Agent, or Firm* — Nerrie M. Zohn

(57) ABSTRACT

Improvements to signaling procedures for use in physical random access channel (PRACH)-based proximity detection are disclosed. Signaling and signaling processes from a serving base station may trigger a more efficient and reliable transmission of PRACH from related user equipment (UE). At the dynamic power nodes (DPNs) monitoring for such PRACH-based proximity, features are disclosed which establish neighbor lists for more efficient management of detection and proximity activation.

27 Claims, 11 Drawing Sheets

(51) Int. Cl.
*G01S 5/00* (2006.01)
*H04W 64/00* (2009.01)
*H04L 1/00* (2006.01)
*H04W 52/02* (2009.01)
*G01S 5/02* (2010.01)
*H04W 28/16* (2009.01)

(52) U.S. Cl.
CPC ......... *H04W 52/283* (2013.01); *H04W 64/00* (2013.01); *G01S 5/02* (2013.01); *H04W 28/16* (2013.01); *H04W 52/0206* (2013.01); *Y02B 60/50* (2013.01)

(56) References Cited

U.S. PATENT DOCUMENTS

2002/0159396 A1* 10/2002 Carlson ................. H04L 1/1848 370/252
2007/0115872 A1 5/2007 Kim et al.
2008/0225786 A1* 9/2008 Han ....................... H04W 72/14 370/329
2010/0041428 A1 2/2010 Chen et al.
2010/0273520 A1* 10/2010 Pelletier ................ H04L 5/0007 455/522
2010/0284373 A1* 11/2010 Makino ................. H04W 36/30 370/332
2013/0089022 A1* 4/2013 Lu ......................... H04W 36/08 370/315

OTHER PUBLICATIONS

International Search Report and Written Opinion—PCT/US2014/013377—ISA/EPO—Jul. 4, 2014.
Partial International Search Report—PCT/US2014/013377—ISA/EPO—May 15, 2014.

* cited by examiner

PRACH-BASED PROXIMITY DETECTION

CROSS-REFERENCE TO RELATED APPLICATIONS

This application claims the benefit of U.S. Provisional Patent Application No. 61/758,644, entitled, "PRACH-BASED PROXIMITY DETECTION", filed on Jan. 30, 2013, which is expressly incorporated by reference herein in its entirety.

BACKGROUND

Field

Aspects of the present disclosure relate generally to wireless communication systems, and more particularly, to physical random access channel (PRACH)-based proximity detection.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Representative aspects of the present disclosure are directed to increased efficiencies in physical random access channel (PRACH) handling in relation to PRACH-based proximity detection based on over-the-air tuning. In selected aspects, signaling from a serving base station may trigger periodic PRACH signaling for a UE. In such aspects, the PRACH signals do not rely on a single, related PDCCH from the serving base station. The signaling from the serving base station may also include various settings that the UE may use when transmitting PRACH, such as a transmission power setting, periodicity, PRACH transmission thresholds, signature sets, and the like. The triggering signal may also notify the UE to transmit PRACH signals while still decoding any received PDCCH transmissions.

Various additional aspects may provide for the serving base station to delay sending the PRACH response messages in order for the UE to transmit multiple PRACH signals using increasing transmission power. After a certain period or when the PRACH transmission power reaches a particular level, the serving base station will send the PRACH response message; thus, causing the UE to stop PRACH transmissions.

Additional aspects of the present disclosure may also provide for any dynamic power nodes (DPNs) to establish neighbor lists that include sets of base stations with root sequences that are routinely monitored during proximity detection. The list may change when the DPN activates into a full-powered mode or may be semi-statically set in a network-wide assignment. Each base station in the neighbor set may be assigned with specific thresholds, in which the threshold may correspond to the irregular or asymmetric footprint of the cell deployment. These thresholds may be pre-determined or dynamically optimized based on various measurements, loading conditions, network events, or the like.

Additional aspects of the disclosure provide for neighbor-specific PRACH configurations for serving cell determination. This aspect allows a DPN to identify the serving cell based suitable partitioning of PRACH resources and analyzing when or which one of the preambles is received. Preambles, PRACH resources, and timing may be coordinated via the backhaul or predetermined by the network or equipment manufacturers. Once the DPN determines the serving base station, corresponding thresholds, such as noted above, may be applied.

Further aspects of the present disclosure are directed to a method of wireless communication that includes transmitting, from a serving base station, a signal to a mobile device served by the serving base station, wherein the signal triggers periodic PRACH transmission from the mobile device.

Further aspects of the present disclosure are directed to a method of wireless communication that includes receiving, at a mobile device, a signal from a serving base station and sending periodic PRACH transmissions from the mobile device in response to the signal.

Further aspects of the present disclosure are directed to a method of wireless communication that include entering a reduced power mode at a DPN, monitoring, by the DPN, for PRACH transmissions from one or more UEs proximate to the DPN, detecting a plurality of candidate PRACH transmissions, combining the plurality of candidate PRACH transmissions at the DPN to determine a detected PRACH transmission from a UE, determining, by the DPN, a proximity of the UE based on the detected PRACH transmission, and modifying operation of the DPN in response to the proximity.

Further aspects of the present disclosure are directed to a method of wireless communication that includes receiving, at a serving base station, a PRACH transmission from a mobile device and delaying, by the serving base station, transmission of a PRACH acknowledgement message to the mobile device.

Further aspects of the present disclosure are directed to a method of wireless communication that includes entering a reduced power mode at a DPN, monitoring, by the DPN, for a set of root sequences associated with at least one base station in a neighbor list at the DPN, wherein the set of root sequences are located in PRACH transmissions from one or more UEs, determining, by the DPN, a proximity of a UE based on a receive power of the PRACH transmission associated with a detected set of root sequences associated with one of the at least one base station in the neighbor list, and modifying operation of the DPN in response to the proximity.

Further aspects of the present disclosure are directed to an apparatus of wireless communication that includes means for establishing communication between a serving base station and a mobile device and means for transmitting, from the serving base station, a signal to the mobile device served by the serving base station, wherein the signal triggers periodic PRACH transmission from the mobile device.

Further aspects of the present disclosure are directed to an apparatus of wireless communication that includes means for receiving, at a mobile device, a signal from a serving base station and means for sending periodic PRACH transmissions from the mobile device in response to the signal.

Further aspects of the present disclosure are directed to an apparatus of wireless communication that includes means for entering a reduced power mode at a DPN, means for monitoring, by the DPN, for PRACH transmissions from one or more UEs proximate to the DPN, means for detecting a plurality of candidate PRACH transmissions, means for combining the plurality of candidate PRACH transmissions at the DPN to determine a detected PRACH transmission from a UE, means for determining, by the DPN, a proximity of the UE based on the detected PRACH transmission, and means for modifying operation of the DPN in response to the proximity.

Further aspects of the present disclosure are directed to an apparatus of wireless communication that includes means for receiving, at a serving base station, a PRACH transmission from a mobile device and means for delaying, by the serving base station, transmission of a PRACH acknowledgement message to the mobile device.

Further aspects of the present disclosure are directed to an apparatus of wireless communication that includes means for entering a reduced power mode at a DPN, means for monitoring, by the DPN, for a set of root sequences associated with at least one base station in a neighbor list at the DPN, wherein the set of root sequences are located in PRACH transmissions from one or more UEs, means for determining, by the DPN, a proximity of a UE based on a receive power of the PRACH transmission associated with a detected set of root sequences associated with one of the at least one base station in the neighbor list, and means for modifying operation of the DPN in response to the proximity.

Further aspects of the present disclosure are directed to a computer program product having a non-transitory computer-readable medium with program code stored thereon, wherein the program code, when executed by a computer, causes the computer to transmit, from a serving base station, a signal to a mobile device served by the serving base station, wherein the signal triggers periodic PRACH transmission from the mobile device.

Further aspects of the present disclosure are directed to a computer program product having a non-transitory computer-readable medium with program code stored thereon, wherein the program code, when executed by a computer, causes the computer to receive, at a mobile device, a signal from a serving base station and send periodic PRACH transmissions from the mobile device in response to the signal.

Further aspects of the present disclosure are directed to a computer program product having a non-transitory computer-readable medium with program code stored thereon, wherein the program code, when executed by a computer, causes the computer to enter a reduced power mode at a DPN, monitor, by the DPN, for PRACH transmissions from one or more UEs proximate to the DPN, detect a plurality of candidate PRACH transmissions, combine the plurality of candidate PRACH transmissions at the DPN to determine a detected PRACH transmission from a UE, determine, by the DPN, a proximity of the UE based on the detected PRACH transmission, and modify operation of the DPN in response to the proximity.

Further aspects of the present disclosure are directed to a computer program product having a non-transitory computer-readable medium with program code stored thereon, wherein the program code, when executed by a computer, causes the computer to receive, at a serving base station, a PRACH transmission from a mobile device and delay, by the serving base station, transmission of a PRACH acknowledgement message to the mobile device.

Further aspects of the present disclosure are directed to a computer program product having a non-transitory computer-readable medium with program code stored thereon, wherein the program code, when executed by a computer, causes the computer to enter a reduced power mode at a DPN, monitor, by the DPN, for a set of root sequences associated with at least one base station in a neighbor list at the DPN, wherein the set of root sequences are located in PRACH transmissions from one or more UEs, determine, by the DPN, a proximity of a UE based on a receive power of the PRACH transmission associated with a detected set of root sequences associated with one of the at least one base station in the neighbor list, and modify operation of the DPN in response to the proximity.

Further aspects of the present disclosure are directed to an apparatus including at least one processor and a memory coupled to the at least one processor. The processor is configured to transmit, from a serving base station, a signal to a mobile device served by the serving base station, wherein the signal triggers periodic PRACH transmission from the mobile device.

Further aspects of the present disclosure are directed to an apparatus including at least one processor and a memory coupled to the at least one processor. The processor is configured to receive, at a mobile device, a signal from a serving base station and send periodic PRACH transmissions from the mobile device in response to the signal.

Further aspects of the present disclosure are directed to an apparatus including at least one processor and a memory coupled to the at least one processor. The processor is configured to enter a reduced power mode at a DPN, monitor, by the DPN, for PRACH transmissions from one or more UEs proximate to the DPN, detect a plurality of candidate PRACH transmissions, combine the plurality of candidate PRACH transmissions at the DPN to determine a detected PRACH transmission from a UE, determine, by the DPN, a proximity of the UE based on the detected PRACH transmission, and modify operation of the DPN in response to the proximity.

Further aspects of the present disclosure are directed to an apparatus including at least one processor and a memory coupled to the at least one processor. The processor is configured to receive, at a serving base station, a PRACH transmission from a mobile device and delay, by the serving base station, transmission of a PRACH acknowledgement message to the mobile device.

Further aspects of the present disclosure are directed to an apparatus including at least one processor and a memory coupled to the at least one processor. The processor is configured to enter a reduced power mode at a DPN, monitor, by the DPN, for a set of root sequences associated with at least one base station in a neighbor list at the DPN, wherein the set of root sequences are located in PRACH transmissions from one or more UEs, determine, by the DPN, a proximity of a UE based on a receive power of the PRACH transmission associated with a detected set of root sequences associated with one of the at least one base station in the neighbor list, and modify operation of the DPN in response to the proximity.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
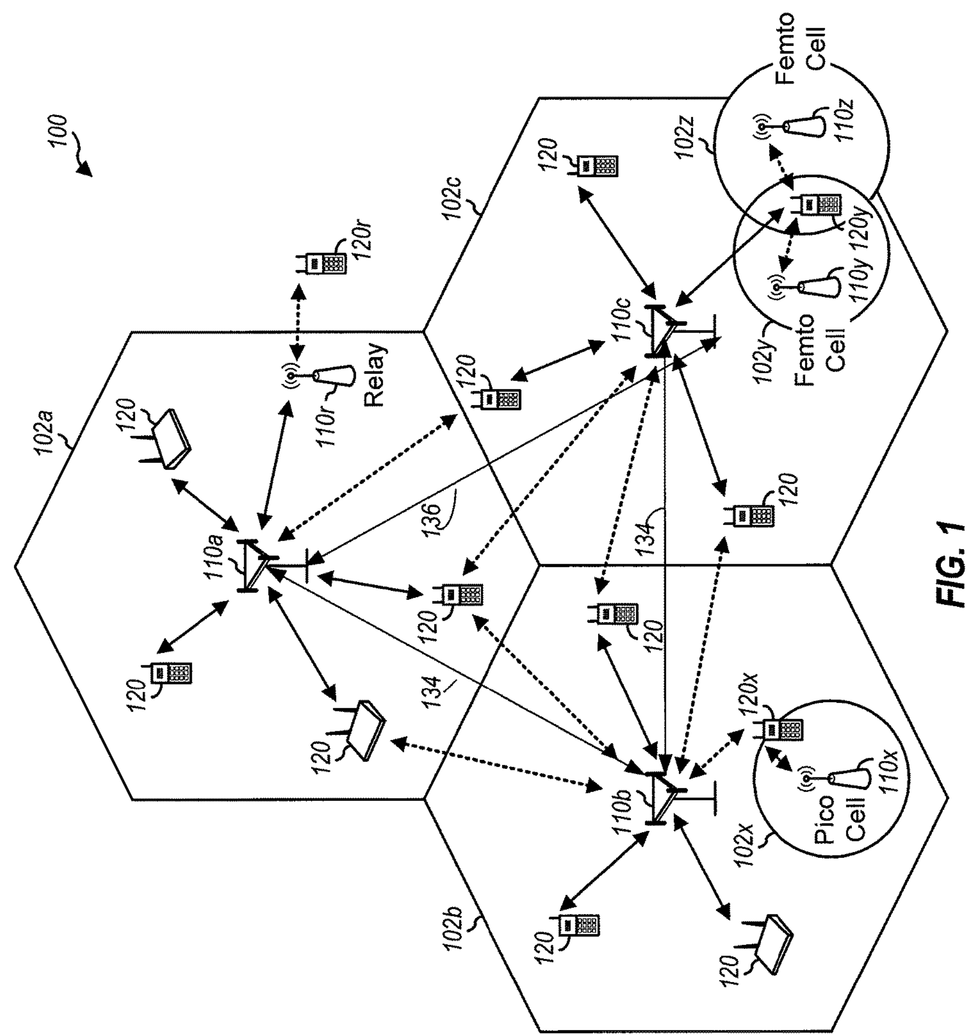
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110*a*, 110*b* and 110*c* are macro eNBs for the macro cells 102*a*, 102*b* and 102*c*, respectively. The eNB 110*x* is a pico eNB for a pico cell 102*x*. And, the eNBs 110*y* and 110*z* are femto eNBs for the femto cells 102*y* and 102*z*, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110*r* may communicate with the eNB 110*a* and a UE 120*r*, in which the relay station 110*r* acts as a relay between the two network elements (the eNB 110*a* and the UE 120*r*) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
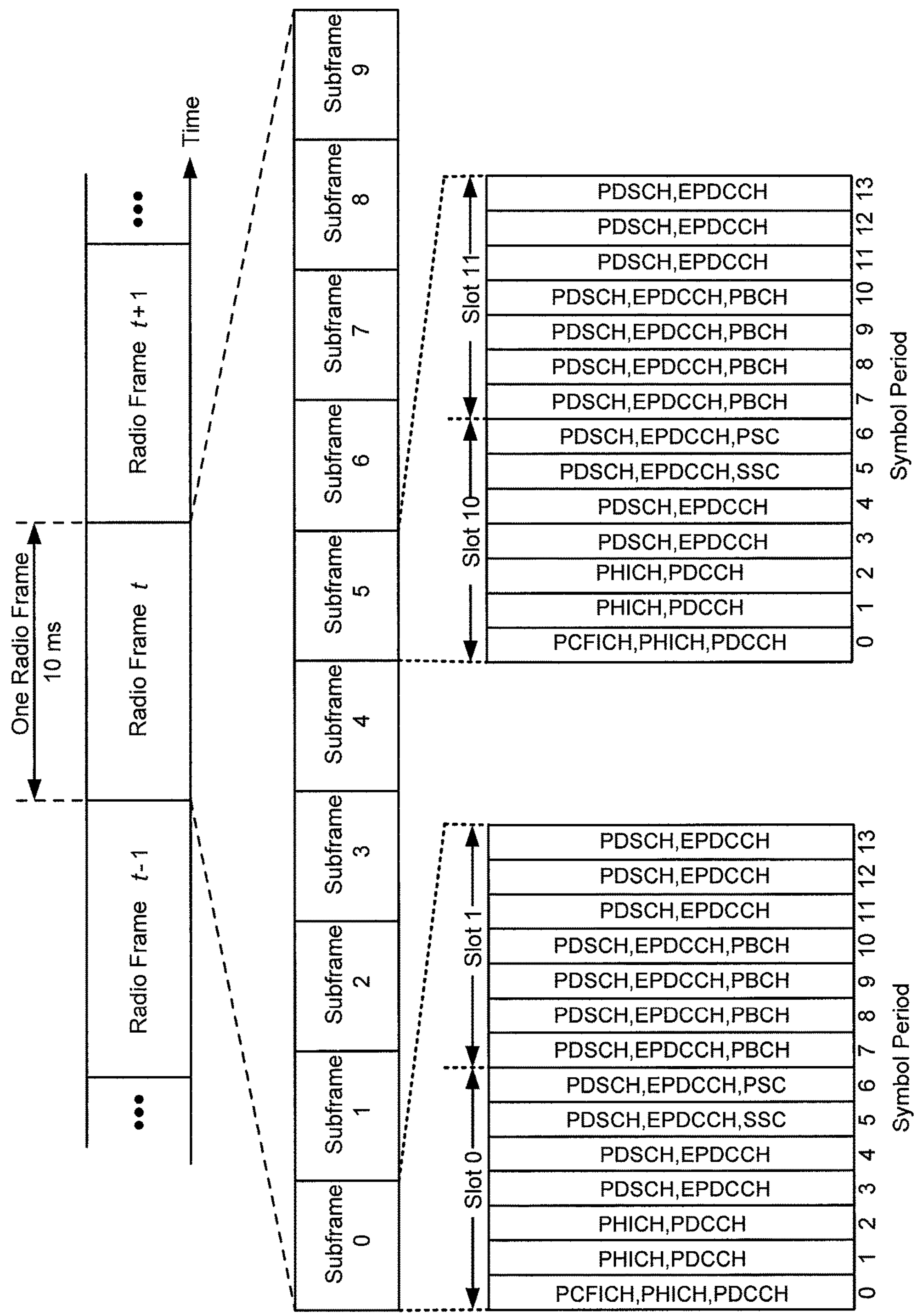
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
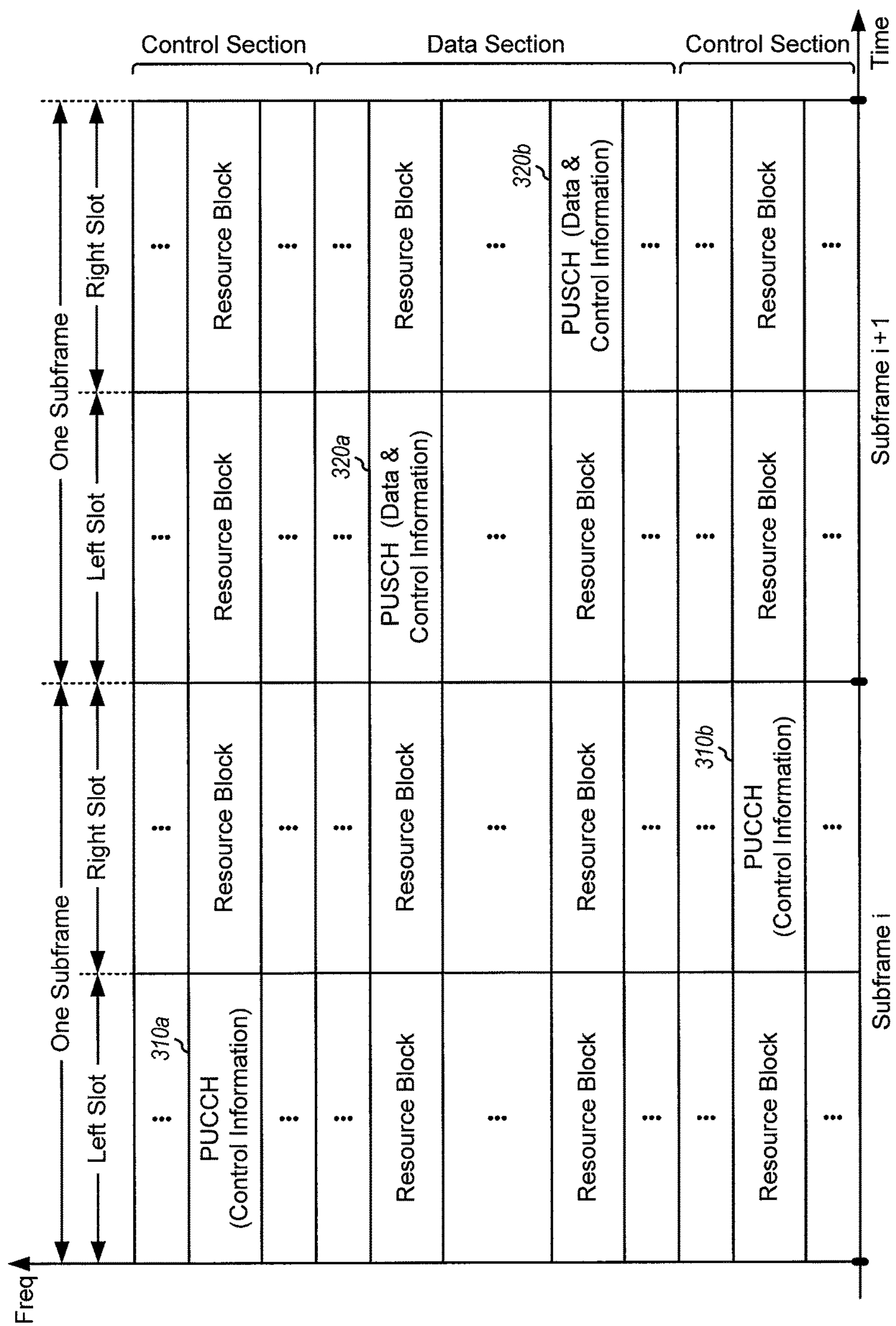
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310*a* and 310*b* in the control section. The UE may transmit only data or both data and control information in a Physical Uplink Shared Channel (PUSCH) on the assigned resource blocks 320*a* and 320*b* in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110*a-c* are usually carefully planned and placed by the provider of the wireless network 100. The macro eNBs 110*a-c* generally transmit at high power levels (e.g., 5 W-40 W). The pico eNB 110*x* and the relay station 110*r*, which generally transmit at substantially lower power levels (e.g., 100 mW-2 W), may be deployed in a relatively unplanned manner to eliminate coverage holes in the coverage area provided by the macro eNBs 110*a-c* and improve capacity in the hot spots. The femto eNBs 110*y-z*, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110*y-z* typically also transmit at substantially lower power levels (e.g., 100 mW-2 W) than the macro eNBs 110*a-c*.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110*x*, is characterized by a substantially lower transmit power when compared with a macro eNB, such as the macro eNBs 110*a-c*. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110*a-c* and the pico eNB 110*x* implies that, in a mixed deployment, the downlink coverage area of the pico eNB 110*x* will be much smaller than that of the macro eNBs 110*a-c*.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110*a-c*, limits the benefits of splitting the cell coverage with the pico eNBs, such as the pico eNB 110*x*, because, the higher downlink received signal strength of the macro eNBs 110*a-c* will attract all of the available UEs, while the pico eNB 110*x* may not be serving any UE because of its much weaker downlink transmission power. Moreover, the macro eNBs 110*a-c* will likely not have sufficient resources to efficiently serve those UEs. Therefore, the wireless network 100 will attempt to actively balance the load between the macro eNBs 110*a-c* and the pico eNB 110*x* by expanding the coverage area of the pico eNB 110*x*. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110*a-c* and the pico eNB 110*x*. However, even with this active balancing of load, downlink interference from the macro eNBs 110*a-c* should be mitigated for the UEs served by the pico eNBs, such as the pico eNB 110*x*. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110*x*, in the presence of the stronger downlink signals transmitted from the higher-powered eNBs, such as the macro eNBs 110*a-c*, the pico eNB 110*x* engages in control channel and data channel interference coordination with the dominant interfering ones of the macro eNBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes may be assigned to a first eNB for use exclusively by the first eNB. Protected subframes may also be referred to as “clean” subframes based on the lack of interference from neighboring eNBs. Prohibited subframes may be subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB’s protected subframe. Common subframes may be used for data transmission by multiple eNBs. Common subframes may also be referred to as “unclean” subframes because of the possibility of interference from other eNBs.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120*y* may be close to the femto eNB 110*y* and may have high received power for the eNB 110*y*. However, the UE 120*y* may not be able to access the femto eNB 110*y* due to restricted association and may then connect to the macro eNB 110*c* (as shown in FIG. 1) or to the femto eNB 110*z* also with lower received power (not shown in FIG. 1). The UE 120*y* may then observe high interference from the femto eNB 110*y* on the downlink and may also cause high interference to the eNB 110*y* on the uplink. Using coordinated interference management, the eNB 110*c* and the femto eNB 110*y* may communicate over the backhaul 134 to negotiate resources. In the negotiation, the femto eNB 110*y* agrees to cease transmission on one of its channel resources, such that the UE 120*y* will not experience as much interference from the femto eNB 110*y* as it communicates with the eNB 110*c* over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷$3\times10^8$, i.e., the speed of light, ‘c’). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 4:
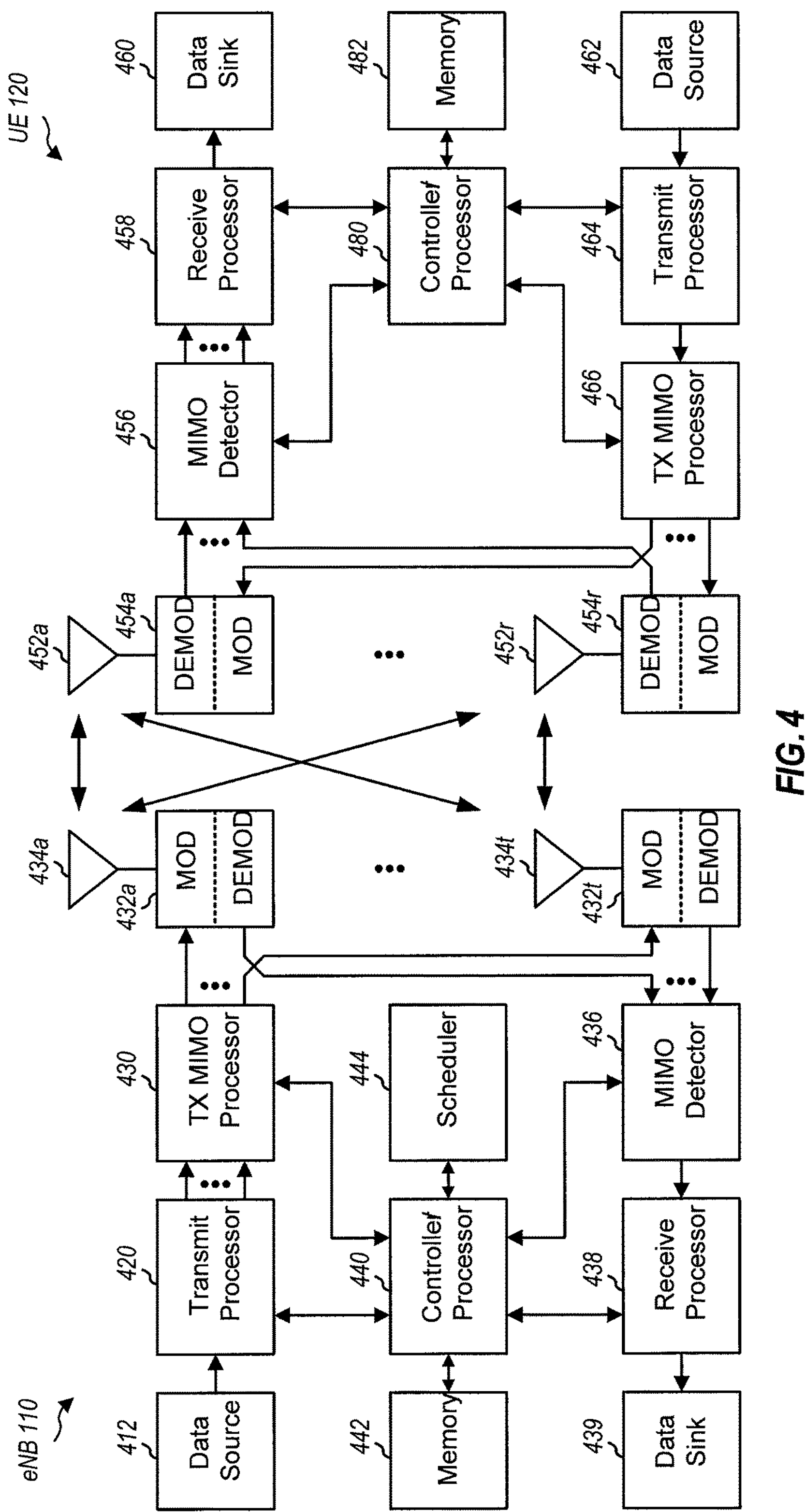
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110*c* in FIG. 1, and the UE 120 may be the UE 120*y*. The eNB 110 may also be a base station of some other type. The eNB 110 may be equipped with antennas 434*a* through 434*t*, and the UE 120 may be equipped with antennas 452*a* through 452*r*.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the eNB 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controllers/processor 480 and/or other processors and modules at the UE 120 may also perform or direct the execution of the functional blocks illustrated in FIGS. 8-13, and/or other processes for the techniques described herein. The memories 442 and 482 may store data and program codes for the eNB 110 and the UE 120, respectively. A scheduler 444 may schedule UEs for data transmission on the downlink and/or uplink.

In heterogeneous networks and networks in which multiple access nodes, base stations, and eNBs may be available for providing communications to one or more UEs, it may be beneficial for such nodes to reduce power when no UEs are being served or when the number of UEs being served falls well below the loading capacity. Various nodes may include energy-saving features that allows a low-power mode of operation, such as turning off completely, reducing transmission signal duty cycle, reducing transmission power, and the like, or facilitates uplink (UL) enhanced ICIC (eICIC), and the like.

With various nodes implementing such power-saving low-powered modes, it is desirable to define a node activation procedure based on proximity detection of active UEs. The present disclosure provides enhanced solutions that utilize transmissions on existing physical uplink (UL) channels for detection of active UEs. The physical uplink channel transmissions may include a random access channel transmission, such as a physical random access channel (PRACH) signature sequence, or a reference signal, such as a sounding reference signal (SRS).

Figure 5:
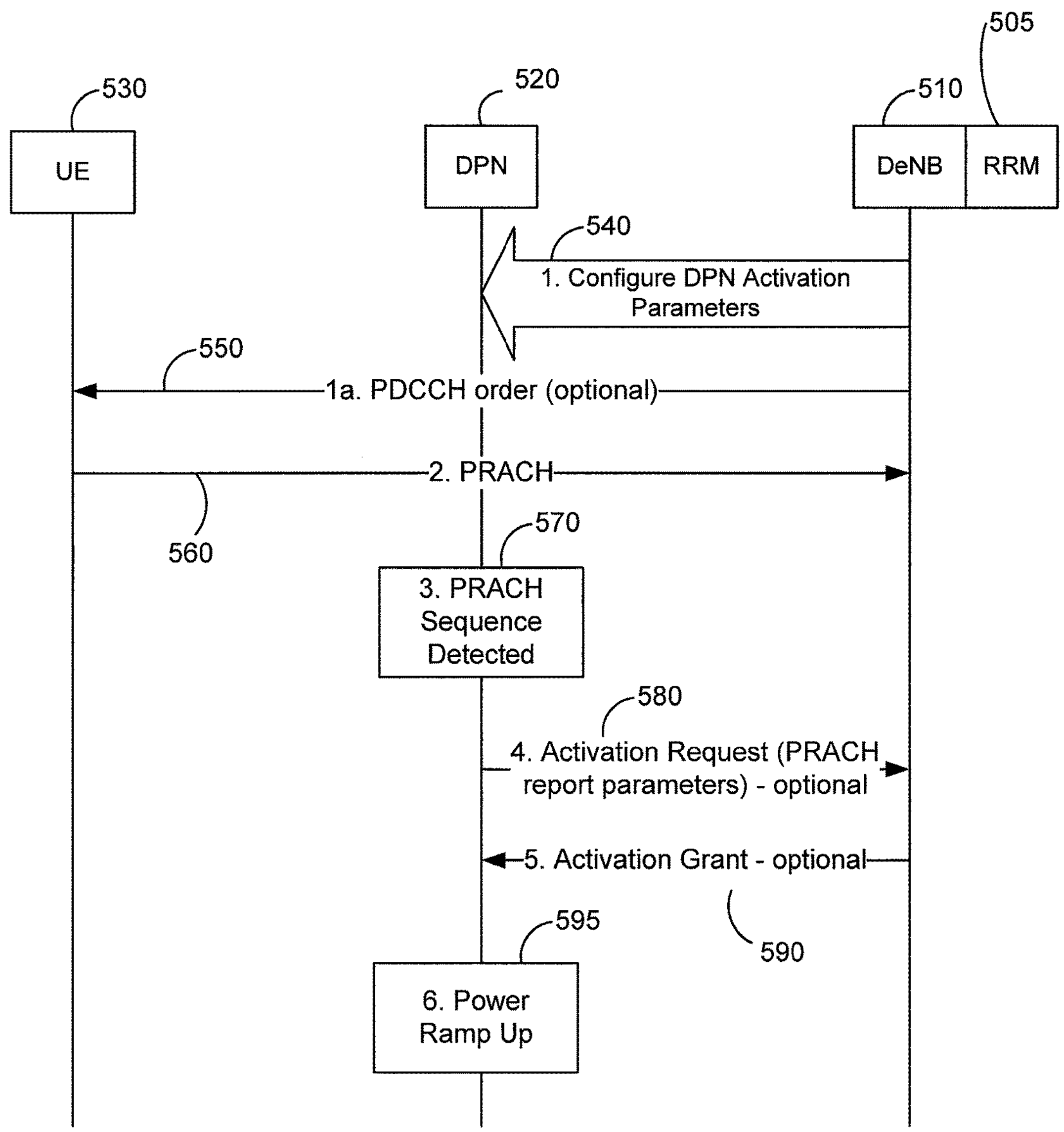
FIG. 5 is a call flow diagram illustrating a dynamic power node (DPN) activation procedure and utilizing UE transmission to activate a DPN according to an aspect of the present disclosure.

FIG. 5 is a call flow diagram illustrating a dynamic power node (DPN) activation procedure and utilizing UE transmission to activate a DPN according to an aspect of the present disclosure. As illustrated in FIG. 5, the donor eNB 510 may include a radio resource management (RRM) server 505. The donor eNB 510 may configure the DPN 520 with activation parameters at time 540. The activation parameters may indicate monitoring conditions (e.g., physical uplink transmissions from UE 530 such as a PRACH signature sequence, SRS, or the like) to detect UE proximity.

A DPN is any various type of base station or access point that may reduce power during periods of inactivity or low activity and, upon detection of a nearby UE, may increase power to participate in communication with the detected UE. A DPN may be a small cell, such as a pico eNB, femto eNB, relay, user eNb (UeNB) (a UE that may be configured as a base station or eNB to other proximate mobile devices), and the like, or may be a large cell, such as a macro eNB, and the like. The example implementations illustrated in the various figures herein may refer to an access point, UeNB, or the like. However, these are merely intended to represent example implementations and those skilled in the art will readily recognize that any type of base station or access point may be used within the scope of the various aspects.

The donor eNB 510 may optionally trigger the UE 530 to transmit on the physical uplink channel. For example, the donor eNB 510 may transmit a control channel order, such as a PDCCH order at time 550, to trigger the transmission of a PRACH signature sequence (or SRS) from the UE 530. Rather than dynamically triggering the uplink transmission, the uplink transmission may be semi-statically configured.

In response to receiving the uplink trigger (e.g., control channel order), the UE 530 transmits (e.g., a PRACH signature sequence, SRS, or the like) on a physical channel at time 560. The DPN 520 may detect the uplink transmission from the UE 530 at time 570. If the uplink transmission satisfies thresholds (e.g., threshold values provided in the activation parameters) the DPN 520 can begin either network activation or autonomous activation.

For network activation, the DPN 520 transmits an activation request at time 580 to the donor eNB 510. In response to receiving the activation request, the donor eNB 510 may transmit an activation grant at time 590 to the DPN 520 so that the relay may power up at time 595. With autonomous activation, the flow proceeds from time 570 directly to time 595 where the DPN 520 automatically activates.

As discussed above, according to one aspect the donor eNB 510 may configure the DPN 520 with activation parameters. The activation parameters enable the DPN 520 to detect the UE 530 proximity. These parameters may include a PRACH signature sequence space, time/frequency resources, or other uplink sounding transmission signal parameters such as those related to an SRS. For PRACH parameters, the DPN 520 may be configured based on the serving cell PRACH configuration and optionally the PRACH configuration of a neighboring cell(s). The activation parameters can also include threshold values, such a minimum signal strength above which the UE 530 is considered to be proximate enough to warrant activating the relay. Alternatively or in addition, interference threshold values can be provided.

As illustrated in FIG. 5, the donor eNB 510 may dynamically trigger the UE 530 to transmit on the uplink, e.g., with a PRACH transmission, SRS, or the like, using a reserved set of signature sequences and time and/or frequency resources. The triggering can be based on criteria observed by the donor eNB 510, such as data load, radio conditions, etc. That is, the donor eNB 510 may only transmit the uplink trigger for UEs with a high downlink data load and when the network is loaded. Alternatively, the donor eNB 510 may semi-statically configure periodic or event based trigger of uplink transmissions during network setup.

It should be noted that the DPN 520 may search for the uplink transmissions, such as a PRACH signal, SRS, or the like, based on all possible configurations. Nonetheless, the number of possible configurations is a limited number.

According to one aspect, the relay may further be limited to search for dedicated preambles activated with an uplink trigger, such as the PDCCH order. Because the DPN 520 is searching for a reserved set of signature sequences, the DPN 520 will not be activated due to uplink transmissions (e.g., PRACH transmissions, SRS, or the like) sent during an initial access phase of a UE 530.

One advantage of PRACH signature sequences is that they handle timing uncertainty by design because the cyclic prefix of a PRACH signature sequence is large.

As further illustrated in FIG. 5, according to one aspect, the UE 530 may transmit an uplink message, such as a PRACH signature sequence, SRS, or the like. The uplink transmission may be on the same carrier frequency used for uplink data transmission to the donor eNB 510 (e.g., 2 GHz) or a carrier frequency of an access link to the DPN 520 (e.g., 3.6 GHz). The UE 530 may be configured to select a PRACH signature sequence from a pool of signature sequences to convey additional information from the UE 530, such as radio conditions, data loading, or power headroom (e.g., transmission power). According to some aspects, the uplink transmission is transmitted with full power or a fixed power level.

A DPN detects the uplink transmissions, such as the PRACH transmissions, SRS, or the like, transmitted by the UEs intended for other nodes. To the UE, the uplink signal request transmitted by the serving eNB simply triggers the random access procedure causing transmission of the PRACH or signals transmission of SRS, and the like. In various aspects of the present disclosure, the UE may not know that the requested PRACH, SRS, or other such requested uplink signal transmissions are intended for DPN activation. The UE receives the PDCCH order from the serving eNB that triggers the uplink signals, and the UE transmits the signals. The DPN may know the resources where preambles intended for the other nodes are sent and may also potentially know the preamble identifiers (IDs) as well, either dynamically, such as through backhaul coordination, or semi-statically, such as through network standards or via original equipment manufacturing (OEM) information settings. These resources and/or the preamble IDs may be used by a DPN to determine an identity of the UE transmitting the preamble, or of the corresponding serving eNB. The identity may include a network-wide identity or property, such as the standards capabilities of the UE (e.g., Rel-8, Rel-10, and the like).

Aspects of the present disclosure provide for periodic uplink signal transmission without necessity for individual signal orders. Instead of requiring a single PDCCH order for each PRACH or SRS transmission, signaling from the serving eNB triggers periodic uplink signal transmissions. For purposes of this disclosure periodic PRACH refers to periodic initiation of new PRACH procedures in which each is independent of the previous transmissions. The single triggering signal from the serving base station triggers multiple periodic uplink signal transmissions from the UE in which the periodicity may be set by the triggering.

Figure 6:
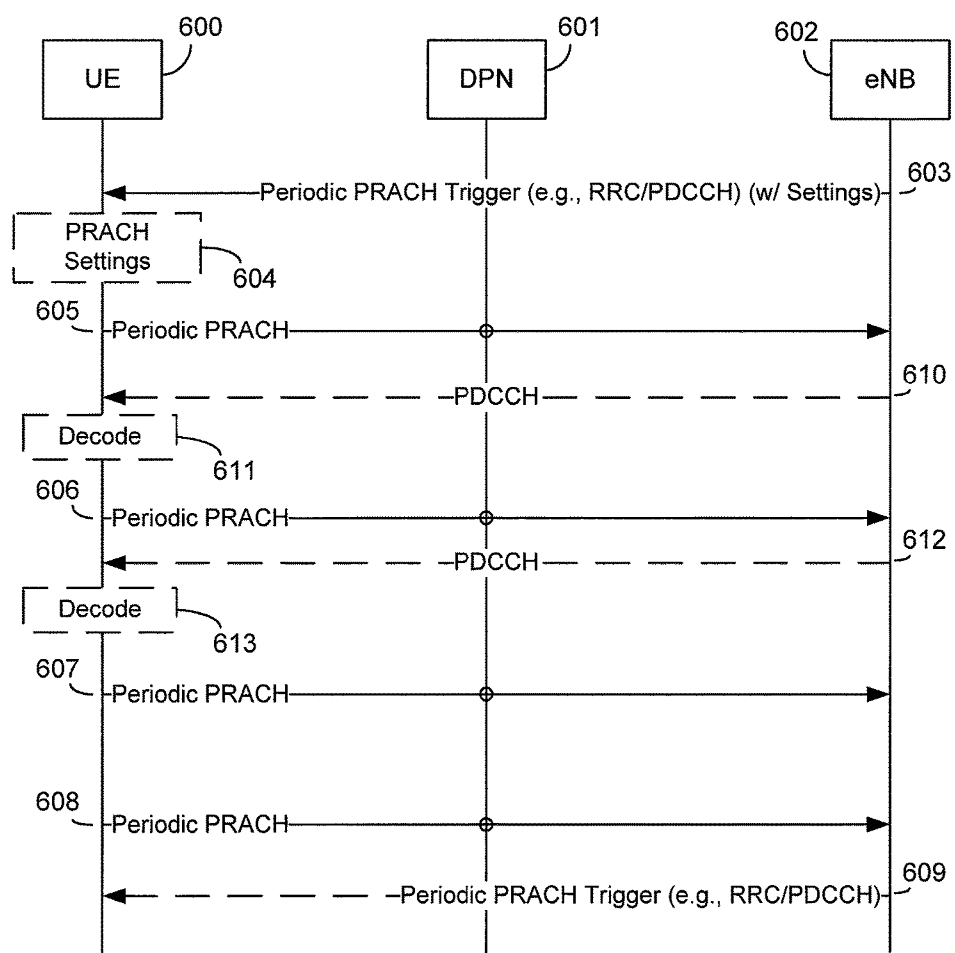
FIG. 6 is a call flow diagram illustrating a periodic PRACH trigger configured according to one aspect of the present disclosure.

FIG. 6 is a call flow diagram illustrating a periodic PRACH trigger configured according to one aspect of the present disclosure. UE 600 is served by eNB 602. A DPN 601 in a reduced power mode monitors for PRACH transmissions from nearby UEs that it may serve or provide carrier support. At time 603, eNB 602 transmits a PRACH trigger signal to UE 600. The PRACH trigger signal may be various signal types of layer 2 or 3, such as a radio resource control (RRC) of layer 3, or a PDCCH of layer 2. The trigger signal triggers a periodic PRACH transmission from UE 600. UE 600 begins transmitting PRACH at time 605. As illustrated, UE 600 also transmits at times 606-608. The PRACH signals transmitted by UE 600 at times 606-608 do not rely on individual PDCCH signals. As the PRACH signals are transmitted from UE 600, DPN 601 monitors and detects the signals at times 605-608. DPN 601 may activate after detecting any of the PRACH signals at times 605-608. Alternatively, DPN 601 may combine the PRACH signals at time 605-608 to increase reliability of the detection.

The trigger signal from eNB 602 may provide an on/off trigger. For example, the trigger signal at time 603 triggers UE 600 to begin transmitting the PRACH signals at times 605-608. At alternate time 609, eNB 602 transmits another trigger signal which indicates to UE 600 to stop transmitting PRACH signals.

In alternative aspects, the trigger signal from eNB 602 at time 603 includes signal settings that UE 600 uses in generating and managing PRACH signals. On receipt of the trigger signal at time 603, UE 600 also implements the PRACH setting 604 for its PRACH transmissions. These settings may provide a duration and interval for the semi-persistent PRACH transmissions. For example, the trigger signal at time 603 includes instructions and settings for the UE 600, including establishing the periodicity of the PRACH signal, signature sequence set, transmit power change with regard to any open loop power sequences, and the like. The settings may also provide reference signal receive power (RSRP) thresholds that indicate when the UE 600 is to transmit the PRACH signals.

The proximity of the UE to the DPN is determined by estimating the rough distance, such as through the path loss, from the UE to the DPN. In order to estimate the distance, both the received power and estimated transmission power of the PRACH are used by the DPN. However, the transmission power for PRACH is not fixed. Currently, the PRACH transmission power is based on the downlink path loss estimate determined by the UE. Accordingly, the estimated distance may be unreliable, which causes the proximity detection by the DPN to be less reliable that desirable.

In additional aspects of the present disclosure, the trigger signal sent at time 603 may include an indication for UE 600 to transmit the PRACH at a fixed power. The fixed power may be a specific power setting or simply and indication to transmit at the maximum power. Thus, when UE 600 receives the trigger signal with the proximity detection power indication, UE 600 sets the transmission power according to the fixed rules (e.g., maximum power, predetermined fixed power), and transmits the PRACH using the fixed power instead of the current path-loss-based power rules. The use of fixed power in the UE PRACH procedure provides the DNP 601 with a reliable mechanism by which to gauge the proximity to the transmitting UE 600.

It should be noted that in alternative aspects of the present disclosure, the example illustrated in FIG. 6 may be implemented using SRS or other types of uplink signals for facilitating proximity detection by the DPN instead of PRACH transmissions.

It should further be noted that the trigger signaling from eNB 602 at time 603 may also include identification to the UE 600 that the triggered PRACH or other uplink signals, such as SRS, and the like, are for proximity detection and prompts the UE 600 to continue decoding any PDCCH data that it receives. In a typical PRACH procedure, a UE will discontinue decoding PDCCH until the communication session is reestablished. Having the trigger signal inform UE 600 to continue decoding, there may be not additional communication delays caused by the suspension of decoding. For example, as UE 600 implements the PRACH settings 604, one of the settings informs UE 600 to continue decoding. At alternative time 610, eNB 602 transmits a PDCCH with downlink data. UE 600, while still in the process of transmitting periodic PRACH, decodes the PDCCH at 611. UE 600 will also decode the PDCCH at 613 sent from eNB 602 at time 612. Thus, in the described aspect of the disclosure, UE 600 will continue to decode PDCCH even though it is placed into a periodic PRACH transmission procedure.

It should be noted that the signal to continue decoding PDCCH may include a distinct signal transmitted in the trigger signal from eNB 602. It may also be a procedure interpreted by the UE 600 simply based on receiving the trigger signal from eNB 602.

Figure 7:
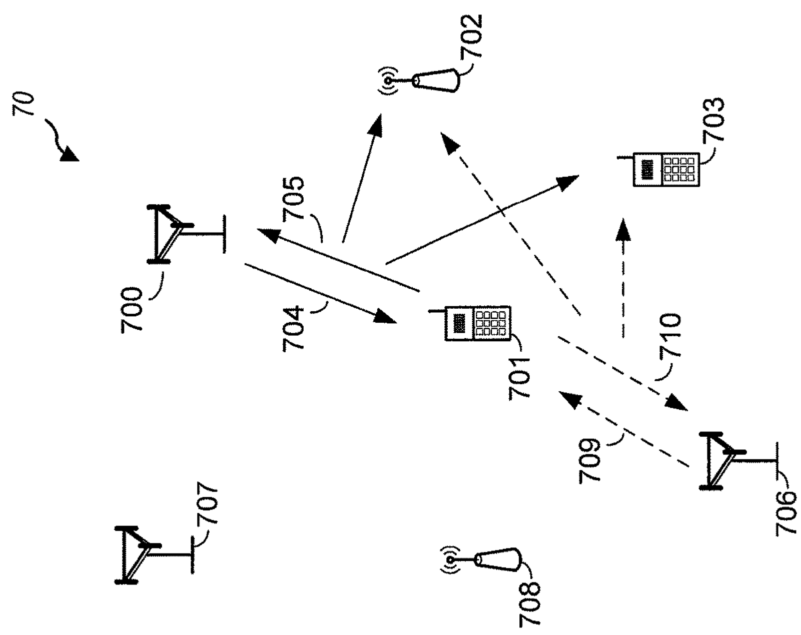
FIG. 7 is a block diagram illustrating a wireless network configured according to one aspect of the present disclosure.

FIG. 7 is a block diagram illustrating a wireless network 70 configured according to one aspect of the present disclosure. Wireless network 70 includes UE 701 served by serving eNB 700. Serving eNB 700 transmits a PRACH trigger signal 704 to UE 701, which may be an RRC signal or a PDCCH that includes an order for PRACH from UE 701. In response, UE 701 begins periodically transmitting PRACH signals 705. DPN 702 and UeNB 703 are currently in a powered-down mode, but are monitoring for PRACH signals for proximate UEs. DPN 702 and UeNB 703 may detect PRACH signals 705 according to PRACH-based proximity procedures. It should be noted that DPN 702 and UeNB 703 may be the same entity (e.g., a DPN may be an UeNB).

According to aspects of the present disclosure, instead of transmitting the PRACH acknowledgment message (e.g., msg2) immediately upon receiving the first transmission of PRACH signals 705, serving eNB 700 delays transmission of the acknowledgment message. Without receiving the PRACH acknowledgement message, UE 701 repeats transmission of PRACH signals 705. With multiple PRACH transmissions, DPN 702 and UeNB 703 are able to detect multiple PRACH signals, which improves the probability of accurate detection and analysis of the PRACH transmission. Moreover, in various aspects, UE 701 may increase transmit power with each successive transmission of PRACH signals 705, as it may believe the signal was not successfully received by serving eNB 700. Thus, DPN 702 and UeNB 703 will additionally increase the probability of success detection and processing of the PRACH transmission.

Serving eNB 700 may control the delay in transmission of the PRACH acknowledgement in various ways. For example, serving eNB 700 may begin a timer when the first of PRACH signals 705 is received. After expiration of the timer, serving eNB 700 will transmit the PRACH acknowledgement, which causes UE 701 to stop transmitting PRACH signals 705.

According to additional aspects of the present disclosure, DPN 702 and UeNB 703 are configured to monitor root sequences from multiple neighbor base stations, rather than sequentially assigned root sequences, as specified in the current LTE standards. The set of monitored root sequences may be semi-statically set network-wide or may be specially maintained for PRACH-based proximity. Moreover, the sets of root sequences change when DPN 702 and UeNB 703 are in a fully-powered eNB state. In order to better manage the sets of root sequences, a neighbor list is maintained at DPN 702 and UeNB 703. The neighbor list may include the set of neighbor base stations for which root sequences are monitored for the sake of PRACH-based proximity detection. For example, the neighbor list maintained by DPN 702 and UeNB 703 may include neighboring base stations, such as eNBs 706-707 and access node 708.

In certain aspects of the present disclosure, such a neighbor list may be configured by the network operator or administrator, or the particular DPN, such as DPN 702 and UeNB 703, may autonomously determine the nearby base stations and build the neighbor list using downlink measurements, such as the downlink measurements made by UeNB 703, or through network listening, such as the network listening performed by DPN 702. Additionally, a neighbor list may be dynamically adapted based on certain network events, such as a UE being handed over to/from a macro base station, such as serving base station 700 or eNBs 706-707 from/to a DPN, such as DPN 702 and UeNB 703.

In various aspects of the present disclosure, neighbor-specific thresholds may be associated with each neighbor base station in a neighbor list maintained for PRACH-based proximity detection. The DPN, such as DPN 702 and UeNB 703, compares the received PRACH power with the assigned threshold correspond to the particular base station to which the UE is sending the PRACH signal. When the threshold is met for any particular base station in the neighbor list, the DPN will determine proximity and switch into the fully-powered active mode.

Different thresholds are assigned to different base stations in the neighbor list because of the different propagation conditions, antenna configurations, and the like, that may be present. Moreover, due to geographic features, such as mountains, buildings, and the like, the footprint of any particular base station may be irregular, non-uniform, or asymmetrically laid out. The thresholds are determined based on these consideration. For example, with respect to the neighbor list maintained by UeNB 703, the threshold associated with serving eNB 700 may be lower than the threshold associated with eNB 706 because eNB 706 is closer to UeNB 703. Thus, if eNB 706 is serving UE 701 and sends PRACH order 709, the PRACH signals 710 detected by UeNB 703 will need to have a lower received power to trigger full activation of UeNB 703 than the receive power of PRACH signals 705, when PRACH signals are sent to and UE 701 is served by serving eNB 700.

It should be noted that in alternative aspects of the present disclosure, the example illustrated in FIG. 7 may be implemented using SRS or other types of uplink signals for facilitating proximity detection by a DPN instead of PRACH transmissions.

Figure 8:
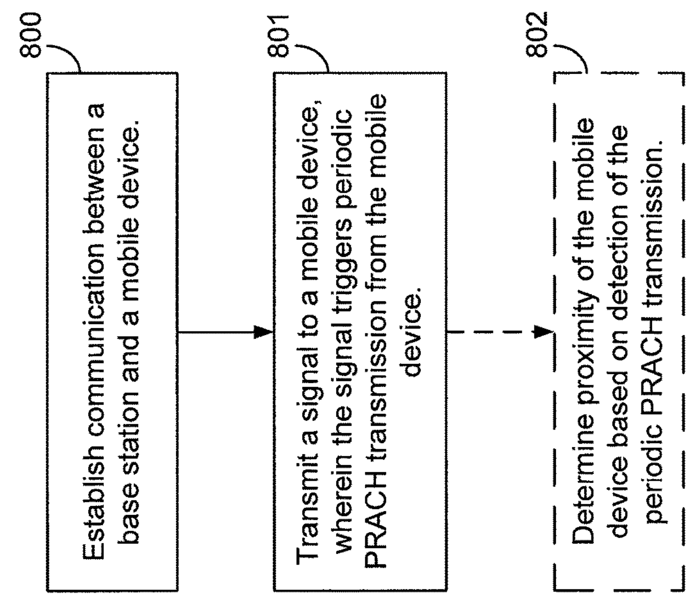
FIG. 8 is a functional block diagram illustrating example blocks executed to implement one aspect of the present disclosure.
Figures 13, 14:
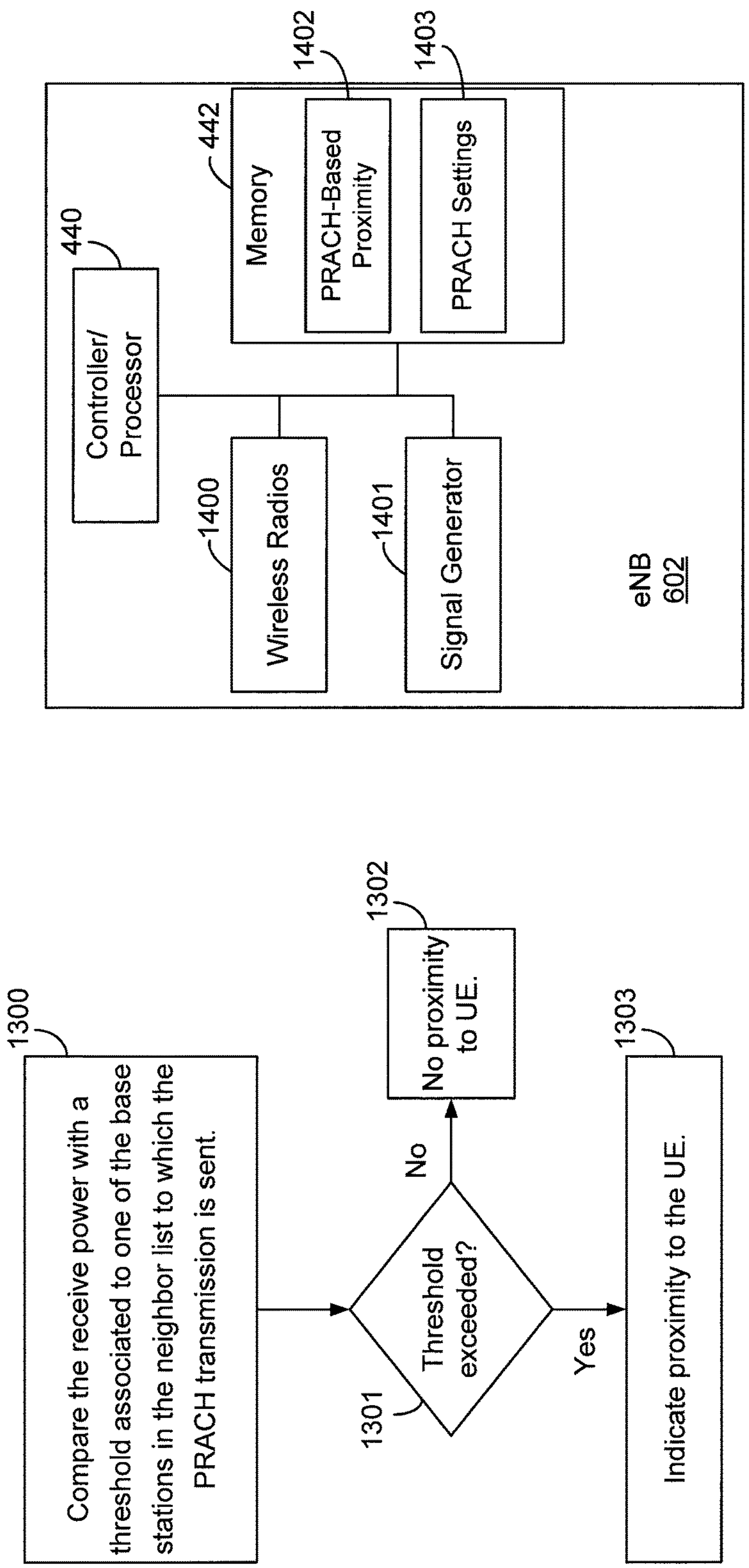
FIG. 13 is a functional block diagram illustrating example blocks executed to implement one aspect of the present disclosure.
FIG. 14 is a block diagram illustrating an eNB configured according to one aspect of the present disclosure.

FIG. 8 is a functional block diagram illustrating example blocks executed to implement one aspect of the present disclosure. At block 800, communication is established between a base station and a mobile device. With reference to FIG. 14, a block diagram of an eNB 602 is illustrated configured according to one aspect of the present disclosure. In example of the blocks presented in FIG. 8, eNB 602 includes a controller/processor 440 which executes logic stored in memory 442 and controls components that define the features and functionality of eNB 602. ENB 602 further includes wireless radios 1400 and signal generator 1401. Wireless radios 1400 may include individual components as illustrated further in FIG. 4. Signal generator 1401 may include individual components, such as transmit processor 420. Under control of controller/processor 440, eNB 602 generates signals using signal generator 1401 and transmits those signals to a UE being served by eNB 602 using wireless radios 1400.

At block 801, the serving base station transmits a signal to a mobile device, wherein the signal triggers periodic PRACH transmission from the mobile device. For example, controller/processor 440 executes PRACH-based proximity logic 1402, stored in memory 442, which operates functionality to generate a trigger signal that triggers the served UE to begin periodic PRACH transmissions. In selected aspects, the operating functionality of PRACH-based proximity logic 1402 may access PRACH settings 1403 which includes settings information for the PRACH signals within the trigger signal for the UE to use in generating and transmitting the periodic PRACH signals, such as periodicity, duration, transmit power, RSRP threshold information, and the like. Under control of controller/processor 440, eNB 602 generates the trigger signal at signal generator 1401, which may generate the trigger signal as a variety of signals, including a layer 3 signal (e.g., RRC), a layer 2 signal (e.g., PDCCH). The trigger signal is then transmitted to the UE via wireless radios 1400.

At optional block 802, a DPN determines proximity of the mobile device based on detection of the periodic PRACH transmissions triggered by the serving base station. Optional block 802 provides functionality for a DPN similar to the functionality illustrated at block 1004 of FIG. 10. For example, eNB 110 may represent the components of a DPN, such as DPN 601. In such a representation, controller/processor 440 of DPN 601, in execution of PRACH-based proximity logic 1603 (FIG. 16), stored in memory 442, creates an operating environment that monitors for signals received through antennas 434*a-t* that are demodulated, by demodulator/modulators 432*a-t*, and determined to be the periodic PRACH signals transmitted by the mobile device. Detection of the periodic PRACH signals prompts the operating environment of the PRACH-based proximity logic 1603, under control of controller/processor 440, to determine that the mobile device is proximate to the serving base station.

Figures 9, 10:
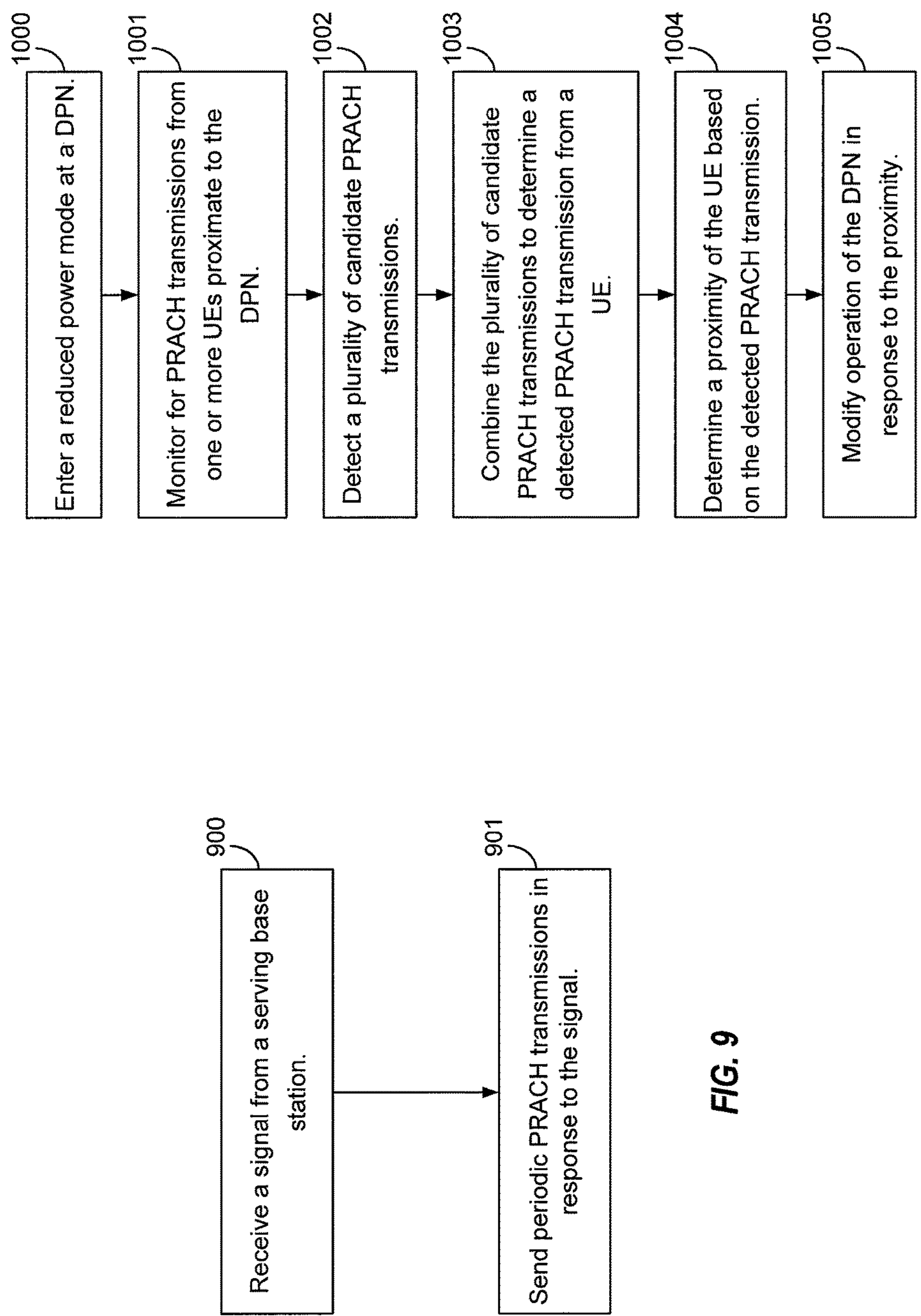
FIG. 9 is a functional block diagram illustrating example blocks executed to implement one aspect of the present disclosure.
FIG. 10 is a functional block diagram illustrating example blocks executed to implement one aspect of the present disclosure.
Figure 15:
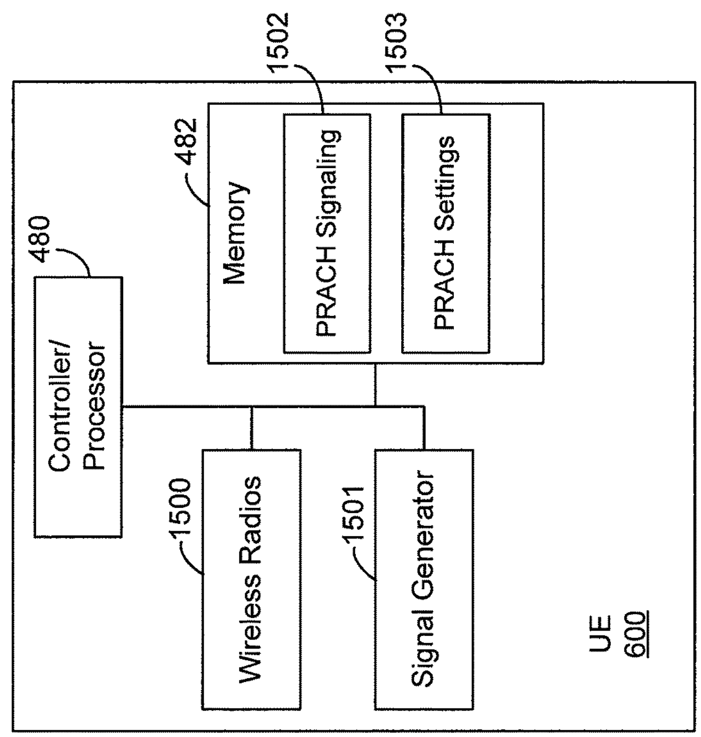
FIG. 15 is a block diagram illustrating an UE configured according to one aspect of the present disclosure.

FIG. 9 is a functional block diagram illustrating example blocks executed to implement one aspect of the present disclosure. At block 900, a mobile device receives a signal from a serving base station. With reference to FIG. 15, a block diagram of a UE 600 is illustrated configured according to one aspect of the present disclosure. In example of the blocks presented in FIG. 9, UE 600 includes a controller/processor 480 which executes logic stored in memory 482 and controls components that define the features and functionality of UE 600. UE 600 further includes wireless radios 1500 and signal generator 1501. Wireless radios 1500 may include individual components as illustrated further in FIG. 4. Signal generator 1501 may include individual components, such as transmit processor 464. Radio frequency signals received and demodulated through wireless radios 1500 may be decoded under control of controller/processor 480 as a trigger signal for triggering PRACH transmissions.

At block 901, the mobile device sends periodic PRACH transmissions in response to the signal. For example, in response to the trigger signal, controller/processor 480 executes PRACH signaling logic 1502, as stored in memory 482. The executing environment of PRACH signaling logic 1502 causes UE 600 to generate a periodic PRACH signal using signal generator 1501. In generating the periodic PRACH signal, the executing environment of PRACH signaling logic 1502 accesses PRACH settings 1503, in memory 482, which may set the transmit power, periodicity of the PRACH transmissions, duration, and the like. The individual settings stored in PRACH setting 1503 may be predetermined by the network, the equipment manufacturer, or may be included in the trigger signal received from the serving base station. Once the PRACH signals are generated, UE 600 transmits the signals over wireless radios 1500.

Figure 16:
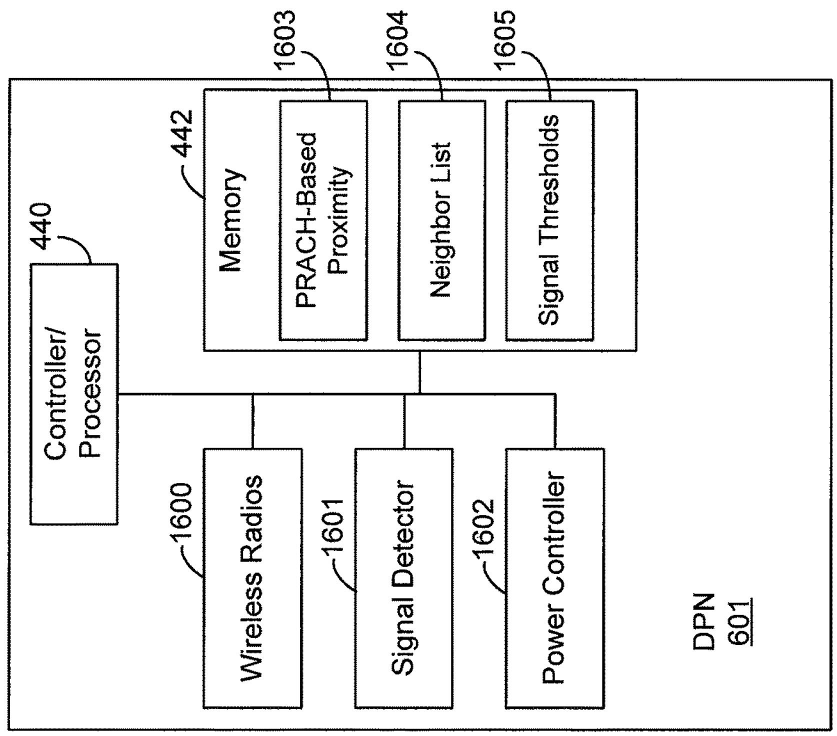
FIG. 16 is a block diagram illustrating an DNP configured according to one aspect of the present disclosure.

FIG. 10 is a functional block diagram illustrating example blocks executed to implement one aspect of the present disclosure. At block 1000, a DPN enters a reduced power mode. With reference to FIG. 16, a block diagram of a DPN 601 is illustrated configured according to one aspect of the present disclosure. In example of the blocks presented in FIG. 10, DPN 601 includes a controller/processor 440 which executes logic stored in memory 442 and controls components that define the features and functionality of DPN 601. DPN 601 further includes wireless radios 1600, signal detector 1601, and power controller 1602. Wireless radios 1600 may include individual components as illustrated further in FIG. 4. Signal detector 1601 may also include individual components, such as MIMO detector 436 and receive processor 438. When not fully engaged in communication with served UEs, DPN 601, under control of controller/processor 440 controlling power controller 1602, may reduce power to switch into a low-powered state.

At block 1001, the DPN monitors for PRACH transmissions from one or more UEs proximate to the DPN. For example, controller/processor 440 executes PRACH-based proximity logic 1603 in memory 442 to begin monitoring for any PRACH transmissions from proximate UEs received through wireless radios 1600.

At block 1002, the DPN detects a plurality of candidate PRACH transmissions. For example, signals that are received at DPN 601 through wireless radios 1600 are processed through signal detector 1601, under control of controller/processor 440 executing PRACH-based proximity logic 1603, to determine whether such received signals are PRACH transmissions.

At block 1003, the DPN combines the plurality of candidate PRACH transmissions to determine a detected PRACH transmission from a UE. For example, with transmission by proximate UEs of periodic or multiple PRACH signals, DPN 601, with signal detector 1601 under control of controller/processor 440, may use statistical combining of the multiple candidate PRACH signals received via wireless radios 1600 to more accurately determine whether the candidate PRACH signals are, indeed, detected PRACH signals.

At block 1004, the DPN determines a proximity of the UE based on the detected PRACH transmission. For example, under control of controller/processor 440 executing PRACH-based proximity logic 1603, the distance of the UE transmitting the detected PRACH signals may be determined by comparing the received signal power of the PRACH signal with the known or estimated transmit power by the UE. If the determined distance falls with a threshold distance from DPN 601, controller/processor 440 determines the UE to be proximate to DPN 601.

At block 1005, the DPN modifies operation of the DPN in response to the proximity. For example, when DPN 601 determines that the UE transmitting the detected PRACH signals is proximate, controller/processor 440 may cause power controller 1602 to switch DPN 601 from the low-powered state into a fully-powered state. In the fully-powered state, DPN 601 may prepare for handover of the UE from its current serving base station or may provide carrier support in a carrier aggregation application.

Figure 11:
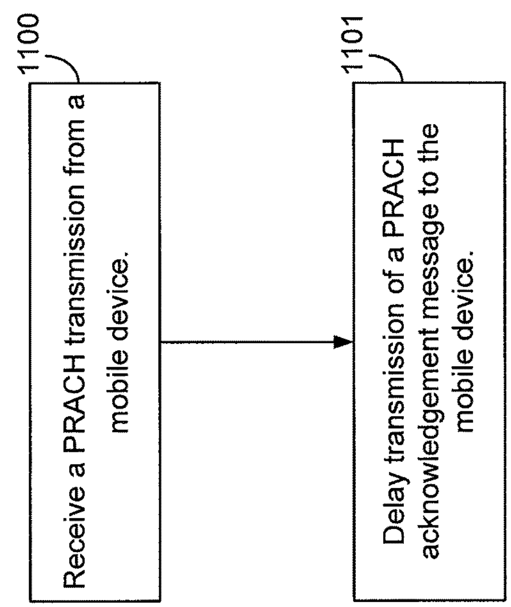
FIG. 11 is a functional block diagram illustrating example blocks executed to implement one aspect of the present disclosure.

FIG. 11 is a functional block diagram illustrating example blocks executed to implement one aspect of the present disclosure. At block 1100, a serving base station receives a PRACH transmission from a mobile device. In example of the blocks presented in FIG. 11, wireless radios 1400 of eNB 602 may also include individual components, such as MIMO detector 436, in addition to the components noted with regard to FIG. 8. Signals received through wireless radio 1400 are decoded and interpreted, under control of controller/processor 440 as PRACH transmissions from a proximate UE. The combination of these components and acts may provide means for receiving, at a serving base station, a PRACH transmission from a mobile device.

At block 1101, the serving base station delays transmission of a PRACH acknowledgement message to the mobile device. For example, in execution by controller/processor 440 of PRACH-based proximity logic 1402, the executing operations cause eNB 602 to delay transmitting the acknowledgement message (e.g., msg2) to the UE transmitting the PRACH signals. The delay may be implemented using a timer (not shown) or by measuring the receive power of the PRACH transmissions and triggering transmission of the acknowledgement when the receive power corresponds to a full power transmission from the UE. The combination of these components and acts may provide means for delaying, by the serving base station, transmission of a PRACH acknowledgement message to the mobile device.

In various aspects of the disclosure, thresholds may be statically configured, semi-statically-configured, such as through the operations, administration, maintenance (OAM) interface, or the thresholds may be dynamically maintained or optimized based on various conditions, such as downlink measurements (e.g., by a UeNB, such as UeNB 703), network events, or network listening. Dynamic optimization may be used to address issues, such as false alarms, where, after detecting proximity to a UE, powering up, but not experiencing a handover or instruction to provide carrier support. If such false alarms are experienced for a particular base station, the DPN may optimize the threshold associated with that base station by increasing the threshold. Thresholds may also be optimized based on current loading conditions, both of the base stations in the neighbor list and of the particular DPN. If the base stations signal a high loading, the DPN may reduce the threshold in order to increase the availability for alleviating the base station load. If the DPN has a higher loading, then the threshold may be increased, in order to avoid further loading through handover of proximate UEs.

Figure 12:
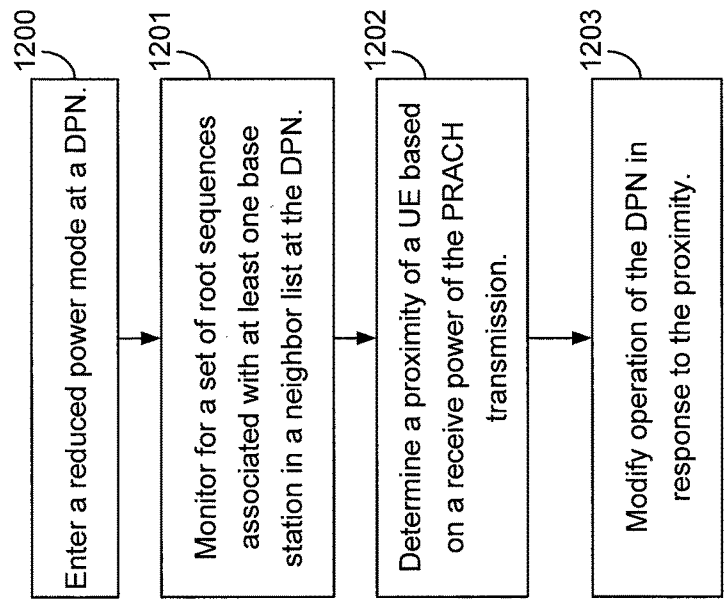
FIG. 12 is a functional block diagram illustrating example blocks executed to implement one aspect of the present disclosure.

FIG. 12 is a functional block diagram illustrating example blocks executed to implement one aspect of the present disclosure. At block 1200, a DPN enters a reduced power mode at a DPN. In example of the blocks presented in FIG. 10, DPN 601 includes a controller/processor 440 which executes logic stored in memory 442 and controls components that define the features and functionality of DPN 601. DPN 601 further includes wireless radios 1600, signal detector 1601, and power controller 1602. Wireless radios 1600 may include individual components as illustrated further in FIG. 4, such as TX MIMO processor 430, modulator/demodulators 432*a-t*, and antennas 434*a-t*. Signal detector 1601 may also include individual components, such as MIMO detector 436 and receive processor 438. When not fully engaged in communication with served UEs, DPN 601, under control of controller/processor 440 controlling power controller 1602, may reduce power to switch into a low-powered state. The combination of these components and acts may provide means for entering a reduced power mode at a DPN.

At block 1201, the DPN monitors for a set of root sequences associated with at least one base station in a neighbor list that it maintains. For example, DPN 601 maintains neighbor list 1604 in memory 442. The neighbor list 1604 may be autonomously compiled and maintained by DPN 601 using measurements and network listening or maybe statically configured by the network or equipment manufacturer or semi-statically configured through the network. Each base station in neighbor list 1604 is distinguished based on the set root sequences that may be sent in a PRACH transmission. Through execution of PRACH-based proximity logic 1603 by controller/processor 440, signal detector 1601 is configured to monitor for the set of root sequences that are embedded in the detected PRACH transmissions received through wireless radios 1600. The combination of these components and acts may provide means for monitoring, by the DPN, for a set of root sequences associated with at least one base station in a neighbor list at the DPN, wherein the set of root sequences are located in PRACH transmissions from one or more UEs.

At block 1202, the DPN determines a proximity of a UE based on a receive power of the PRACH transmission. For example, under control of controller/processor 440 executing PRACH-based proximity logic 1603, the distance of the UE transmitting the detected PRACH signals may be determined by comparing the received signal power of the PRACH signal with the known or estimated transmit power by the UE. If the determined distance falls with a threshold distance from DPN 601, controller/processor 440 determines the UE to be proximate to DPN 601. The combination of these components and acts may provide means for determining, by the DPN, a proximity of a UE based on a receive power of the PRACH transmission associated with a detected set of root sequences associated with one of the at least one base station in the neighbor list.

At block 1203, the DPN modifies operation of the DPN in response to the proximity. For example, when DPN 601 determines that the UE transmitting the detected PRACH signals is proximate, controller/processor 440 may cause power controller 1602 to switch DPN 601 from the low-powered state into a fully-powered state. In the fully-powered state, DPN 601 may prepare for handover of the UE from its current serving base station or may provide carrier support in a carrier aggregation application. The combination of these components and acts may provide means for modifying operation of the DPN in response to the proximity.

FIG. 13 is a functional block diagram illustrating example blocks executed to implement one aspect of the present disclosure. At block 1300, a DPN compares the receive power with a threshold associated to one of the base stations in the neighbor list to which the PRACH transmission is sent by the UE. For example, in addition to the base stations that are identified in neighbor list 1604, each such base station in neighbor list 1604 may be assigned a threshold value in signal thresholds 1605. The threshold values are assigned based on various characteristics and conditions, such as propagation conditions, geographic features, antenna configurations, and the like. The thresholds in signal thresholds 1605 are used by DPN 601 under control of controller/processor 440 in determining proximity of the UE transmitting the detected PRACH signals. The combination of these components and acts may provide means for comparing the receive power with a threshold associated to the one of the at least one base station in the neighbor list to which the PRACH transmission is sent by the UE, wherein each of the at least one base station in the neighbor list is associated with its own threshold.

At block 1301, a determination is made by the DPN whether the threshold has been exceeded. For example, in executing PRACH-based proximity logic 1603, controller/processor 440 compares the receive power of the detected PRACH transmission with the specific threshold maintained in signal thresholds 1605 that is associated with the base station in neighbor list 1604 to which the UE is transmitting the PRACH signal.

At block 1302, if the threshold is not met, the DPN determines that the UE is not proximate to the DPN. For example, DPN 601 may determine that the threshold has not been met and remain in its low-powered state.

At block 1303, if the threshold is met, the DPN will indicate that the UE is proximate to the DPN. For example, DPN 601 may determine that the threshold is met and trigger power controller 1602, under control of controller/processor 440, to reestablish full power.

It should be noted that where A2 thresholds (where the serving cell drops below a specific serving threshold) are configured for determining whether a base station should begin sending PRACH orders to a given UE, the A2 thresholds and PRACH power thresholds may be jointly optimized as described above. Moreover, A2 events, different thresholds, and other various related configurations may be exchanged among the base stations using the backhaul network.

In various further aspects of the present disclosure, neighbor-specific PRACH configurations may be provided for serving cell determination. This process involves identifying which base station in the neighbor list the UE sending PRACH is associated to. For example, referring back to wireless network 70 of FIG. 7, when a DPN, such as DPN 702 or UeNB 703, detects the PRACH signals 705, it may not readily know whether UE 701 is associated with serving eNB 700, eNBs 706-707, or access node 708. Because the thresholds are associate with particular base stations in the neighbor list, the DPN would desire to identify the particular base station in order to apply the appropriate threshold. This identification can be obtained in various aspects by means of suitable partitioning of PRACH resources (e.g., preambles or transmission time opportunities) among the neighbor eNBs. Depending, for example, on when the preamble is received, or which preamble is received, the DPN, such as DPN 702 or UeNB 703, determines which of the base stations is the serving base station and applies the corresponding threshold. For example, if UeNB 703 detects PRACH signal 710, UeNB 703 may use the PRACH resource partitioning to determine that eNB 706 is the serving base station. UeNB 703 would then apply the threshold associated with eNB 706 in its neighbor list.

It should be noted that configuration of the PRACH resource partitioning, such as with non-colliding PRACH resources, preamble IDs, timing, and the like, macro base stations may coordinate using the backhaul network. Such coordination may be dynamic or semi-static, such as through exchanging configurations.

In some instances, a DPN may encounter a negative delay, for instance when the UE is closer to the DPN than to its serving eNB. In this case, the cyclic shift of a detected PRACH signal does not match up with the expected shift based on the expected location of the UE or serving base station. The DPN cannot accurately detect proximity with such a negative delay. Therefore, in order to accommodate such instances, the DPN monitors two consecutive PRACH cyclic shifts. With the two consecutive cyclic shifts, the DPN may average the signal-to-interference-plus-noise ratio (SINR) resulting across the two shifts, take the maximum received energy across the cyclic shifts, or the like in order to make the determination.

It should be noted that, for the transmitting side, in order to avoid ambiguity, the base station should make sure that an adjacent shift is not used when sending a PRACH order for neighbor cell proximity detection.

It should further be noted that the timing estimates monitored by a DPN may be used, in addition to received energy of the PRACH in order to reduce the number of false positives that could occur. For example, where the energy of the detected PRACH exceeds a particular threshold, yet the timing falls outside of a predefined window of what the expected timing should be, the DPN may determine not to fully activate. Such a predefined window may be determined based on the network deployment.

It should be noted that in additional aspects of the present disclosure, interference cancellation principles may be used to reduce interference when multiple PRACH signals from multiple UEs occur on the same resources. Estimated SINR will typically saturate at high carrier-to-interference (C/I) because of energy leakage. Because of this relationship, it is possible to: (i) estimate the channel impulse response from the UE to the DPN, (ii) reconstruct the received signal corresponding to the transmitted preamble, since both the sequence and the channel are known or estimated, (iii) remove the re-constructed signal from the received signal, and (iv) compute cross-correlation of the cleaned up received signal with an unused root sequence to compute noise. These steps are repeated for every detected sequence.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8-13 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:

transmitting, from a serving base station, a signal to a mobile device in communication with the serving base station, wherein the signal triggers the mobile device to transmit periodic transmissions on a physical random access channel (PRACH) during a time period, wherein the mobile device remains in communication with the serving base station and continues decoding data received from the serving base station during the time period;

transmitting, by the serving base station, downlink data to the mobile device for decoding during the time period; and receiving, by the serving base station, uplink data from the mobile device during the time period, wherein the signal includes one or more of:

a signature sequence set for the periodic transmissions on the PRACH;

a transmit power delta for open loop transmission power control;

a fixed transmit power for the periodic transmissions on the PRACH; and a proximity detection flag.

2. The method of claim 1, further comprising:

transmitting, from the serving base station, a deactivation signal to the mobile device, wherein the deactivation signal stops the periodic transmissions on the PRACH during the time period.

3. The method of claim 1, wherein the signal includes one or more of:

a duration of the periodic transmissions on the PRACH;

an interval of the periodic transmissions on the PRACH; and a periodicity of the periodic transmissions on the PRACH.

4. The method of claim 1, wherein the one or more included in the signal further includes one or more of:

a decode continuation signal, wherein the decode continuation signal signals the mobile device to continue the decoding of the data received from the serving base station during the periodic transmissions on the PRACH; and a combination of the one or more included in the signal, wherein the proximity detection flag indicates to the mobile device to use one of: a standard transmit power and the fixed transmit power.

5. The method of claim 4, wherein the fixed transmit power includes one of:

a predetermined transmit power less than maximum transmit power of the mobile device; and the maximum transmit power of the mobile device.

6. The method of claim 5, wherein the predetermined transmit power is signaled by a wireless communication network.

7. The method of claim 1, further comprising:

receiving, at the serving base station, a PRACH transmission from the mobile device during the periodic transmissions on the PRACH; and delaying, by the serving base station, transmission of a PRACH acknowledgement message to the mobile device.

8. The method of claim 7, further comprising:

detecting a preamble in the received PRACH associated with the mobile device, wherein the delaying includes:

delaying transmission of the PRACH acknowledgement for a predetermined time.

9. An apparatus configured for wireless communication, comprising:

at least one processor; and a memory coupled to the at least one processor, wherein the at least one processor is configured:

to transmit, from a serving base station, a signal to a mobile device in communication with the serving base station, wherein the signal triggers the mobile device to transmit periodic transmissions on a physical random access channel (PRACH) during a time period, wherein the mobile device remains in communication with the serving base station and continues decoding data received from the serving base station during the time period;

to transmit, by the serving base station, downlink data to the mobile device for decoding during the time period; and to receive, by the serving base station, uplink data from the mobile device during the time period, wherein the signal includes one or more of:

a signature sequence set for the periodic transmissions on the PRACH;

a transmit power delta for open loop transmission power control;

a fixed transmit power for the periodic transmissions on the PRACH; and a proximity detection flag.

10. The apparatus of claim 9, further comprising configuration of the at least one processor to transmit, from the serving base station, a deactivation signal to the mobile device, wherein the deactivation signal stops the periodic transmissions on the PRACH during the time period.

11. The apparatus of claim 9, wherein the signal includes one or more of:

a duration of the periodic transmissions on the PRACH;

an interval of the periodic transmissions on the PRACH; and a periodicity of the periodic transmissions on the PRACH.

12. The apparatus of claim 9, wherein the one or more included in the signal further includes one or more of:

a decode continuation signal, wherein the decode continuation signal signals the mobile device to continue the decoding of the data received from the serving base station during the periodic transmissions on the PRACH; and a combination of the one or more included in the signal, wherein the proximity detection flag indicates to the mobile device to use one of: a standard transmit power and the fixed transmit power.

13. The apparatus of claim 9, further comprising configuration of the at least one processor:

to receive, at the serving base station, a PRACH transmission from the mobile device during the periodic transmissions on the PRACH; and to delay, by the serving base station, transmission of a PRACH acknowledgement message to the mobile device.

14. A non-transitory computer-readable medium having program code recorded thereon, the program code comprising program code for causing a computer:

to transmit, from a serving base station, a signal to a mobile device in communication with the serving base station, wherein the signal triggers the mobile device to transmit periodic transmissions on a physical random access channel (PRACH) during a time period, wherein the mobile device remains in communication with the serving base station and continues decoding data received from the serving base station during the time period;

to transmit, by the serving base station, downlink data to the mobile device for decoding during the time period; and to receive, by the serving base station, uplink data from the mobile device during the time period, wherein the signal includes one or more of:

a signature sequence set for the periodic transmissions on the PRACH;

a transmit power delta for open loop transmission power control;

a fixed transmit power for the periodic transmissions on the PRACH; and a proximity detection flag.

15. The non-transitory computer-readable medium of claim 14, further comprising:

program code for causing the computer to transmit, from the serving base station, a deactivation signal to the mobile device, wherein the deactivation signal stops the periodic transmissions on the PRACH during the time period.

16. The non-transitory computer-readable medium of claim 14, wherein the signal includes one or more of:

a duration of the periodic transmissions on the PRACH;

an interval of the periodic transmissions on the PRACH; and a periodicity of the periodic transmissions on the PRACH.

17. The non-transitory computer-readable medium of claim 14, wherein the one or more included in the signal further includes one or more of:

a decode continuation signal, wherein the decode continuation signal signals the mobile device to continue the decoding of the data received from the serving base station during the periodic transmissions on the PRACH; and a combination of the one or more included in the signal, wherein the proximity detection flag indicates to the mobile device to use one of: a standard transmit power and the fixed transmit power.

18. The non-transitory computer-readable medium of claim 17, wherein the fixed transmit power includes one of:

a predetermined transmit power less than maximum transmit power of the mobile device; and the maximum transmit power of the mobile device.

19. The non-transitory computer-readable medium of claim 18, wherein the predetermined transmit power is signaled by a wireless communication network.

20. The non-transitory computer-readable medium of claim 14, further comprising:

program code for causing the computer to receive, at the serving base station, a PRACH transmission from the mobile device during the periodic transmissions on the PRACH; and program code for causing the computer to delay, by the serving base station, transmission of a PRACH acknowledgement message to the mobile device.

21. The non-transitory computer-readable medium of claim 20, further comprising:

program code for causing the computer to detect a preamble in the received PRACH associated with the mobile device, wherein the program code for causing the computer to delay includes:

program code for causing the computer to delay transmission of the PRACH acknowledgement for a predetermined time.

22. An apparatus configured for wireless communication, comprising:

means for transmitting, from a serving base station, a signal to a mobile device in communication with the serving base station, wherein the signal triggers the mobile device to transmit periodic transmissions on a physical random access channel (PRACH) during a time period, wherein the mobile device remains in communication with the serving base station and continues decoding data received from the serving base station during the time period;

means for transmitting, by the serving base station, downlink data to the mobile device for decoding during the time period;

means for receiving, by the serving base station, uplink data from the mobile device during the time period; and means for transmitting, from the serving base station, a deactivation signal to the mobile device, wherein the deactivation signal stops the periodic transmissions on the PRACH during the time period, wherein the signal includes one or more of:

a signature sequence set for the periodic transmissions on the PRACH;

a transmit power delta for open loop transmission power control;

a fixed transmit power for the periodic transmissions on the PRACH; and a proximity detection flag.

23. The apparatus of claim 22, wherein the signal further includes one or more of:

a duration of the periodic transmissions on the PRACH;

an interval of the periodic transmissions on the PRACH;

a periodicity of the periodic transmissions on the PRACH;

a decode continuation signal, wherein the decode continuation signal signals the mobile device to continue decoding data received from the serving base station during the periodic transmissions on the PRACH; and a combination thereof, wherein the proximity detection flag indicates to the mobile device to use one of: a standard transmit power and the fixed transmit power.

24. The apparatus of claim 23, wherein the fixed transmit power includes one of:

a predetermined transmit power less than maximum transmit power of the mobile device; and the maximum transmit power of the mobile device.

25. The apparatus of claim 24, wherein the predetermined transmit power is signaled by a wireless communication network.

26. The apparatus of claim 22, further comprising:

means for receiving, at the serving base station, a PRACH transmission from the mobile device during the periodic transmissions on the PRACH; and means for delaying, by the serving base station, transmission of a PRACH acknowledgement message to the mobile device.

27. The apparatus of claim 26, further comprising:

means for detecting a preamble in the received PRACH associated with the mobile device, wherein the means for delaying includes:

means for delaying transmission of the PRACH acknowledgement for a predetermined time.

* * * * *